Figure 1:
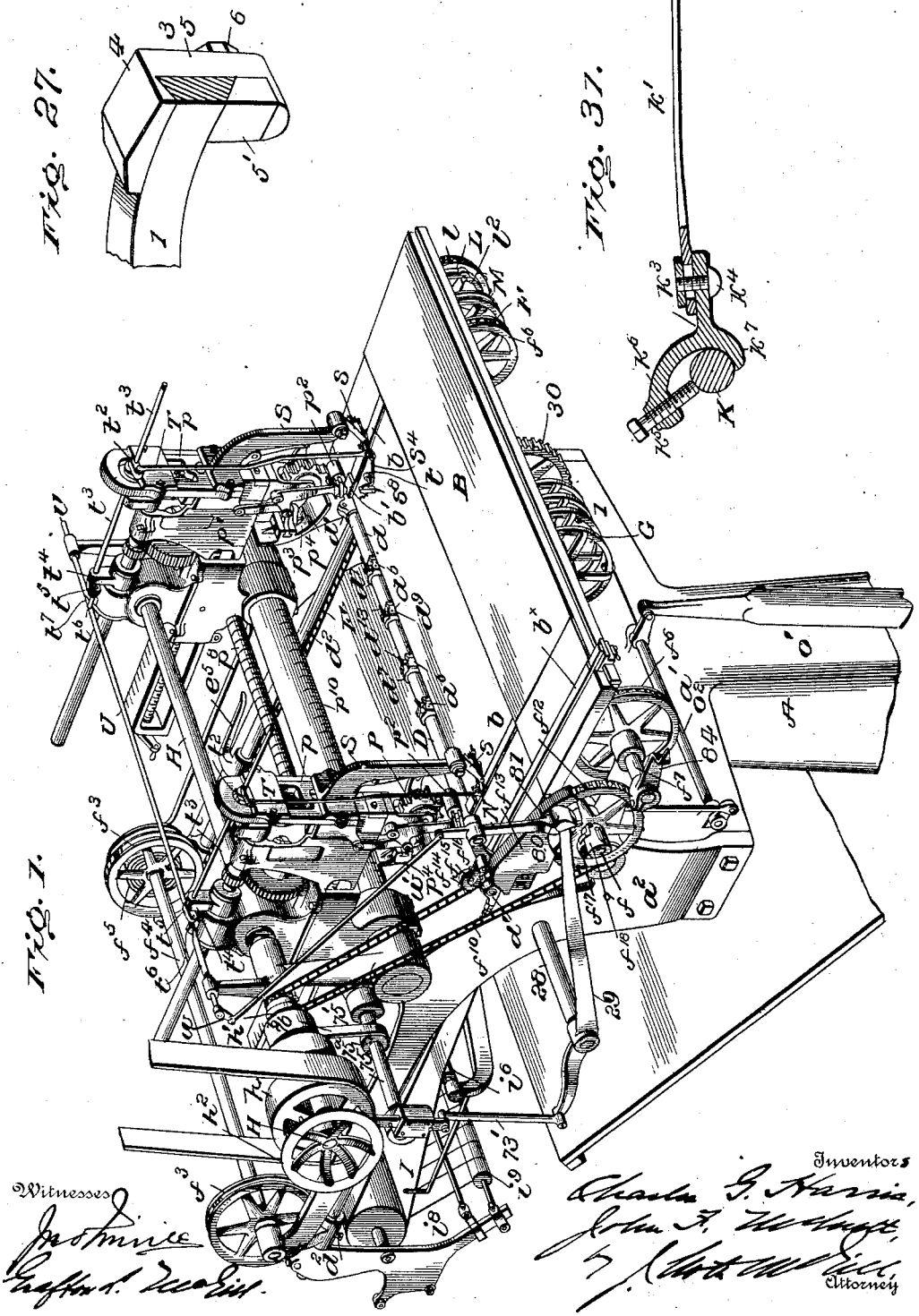

No. 686,728. Patented Nov. 19, 1901.
C. G. HARRIS & J. F. McNUTT.
NUMBERING MACHINE.
(Application filed June 27, 1898.)
(No Model.) 10 Sheets—Sheet 1.

No. 686,728.

C. G. HARRIS & J. F. McNUTT.
NUMBERING MACHINE.
(Application filed June 27, 1898.)

(No Model.)

Patented Nov. 19, 1901.

10 Sheets—Sheet 4.

No. 686,728. Patented Nov. 19, 1901.
C. G. HARRIS & J. F. McNUTT.
NUMBERING MACHINE.
(Application filed June 27, 1898.)
(No Model.) 10 Sheets—Sheet 5.

No. 686,728. Patented Nov. 19, 1901.
C. G. HARRIS & J. F. McNUTT.
NUMBERING MACHINE.
(Application filed June 27, 1898.)
(No Model.) 10 Sheets—Sheet 6.

Witnesses
Inventors
Attorney

No. 686,728. Patented Nov. 19, 1901.
C. G. HARRIS & J. F. McNUTT.
NUMBERING MACHINE.
(Application filed June 27, 1898.)
(No Model.) 10 Sheets—Sheet 7.

Fig. 70ª.

Witnesses
Inventors
Attorney

No. 686,728. Patented Nov. 19, 1901.
C. G. HARRIS & J. F. McNUTT.
NUMBERING MACHINE.
(No Model.) (Application filed June 27, 1898.)
10 Sheets—Sheet 8.
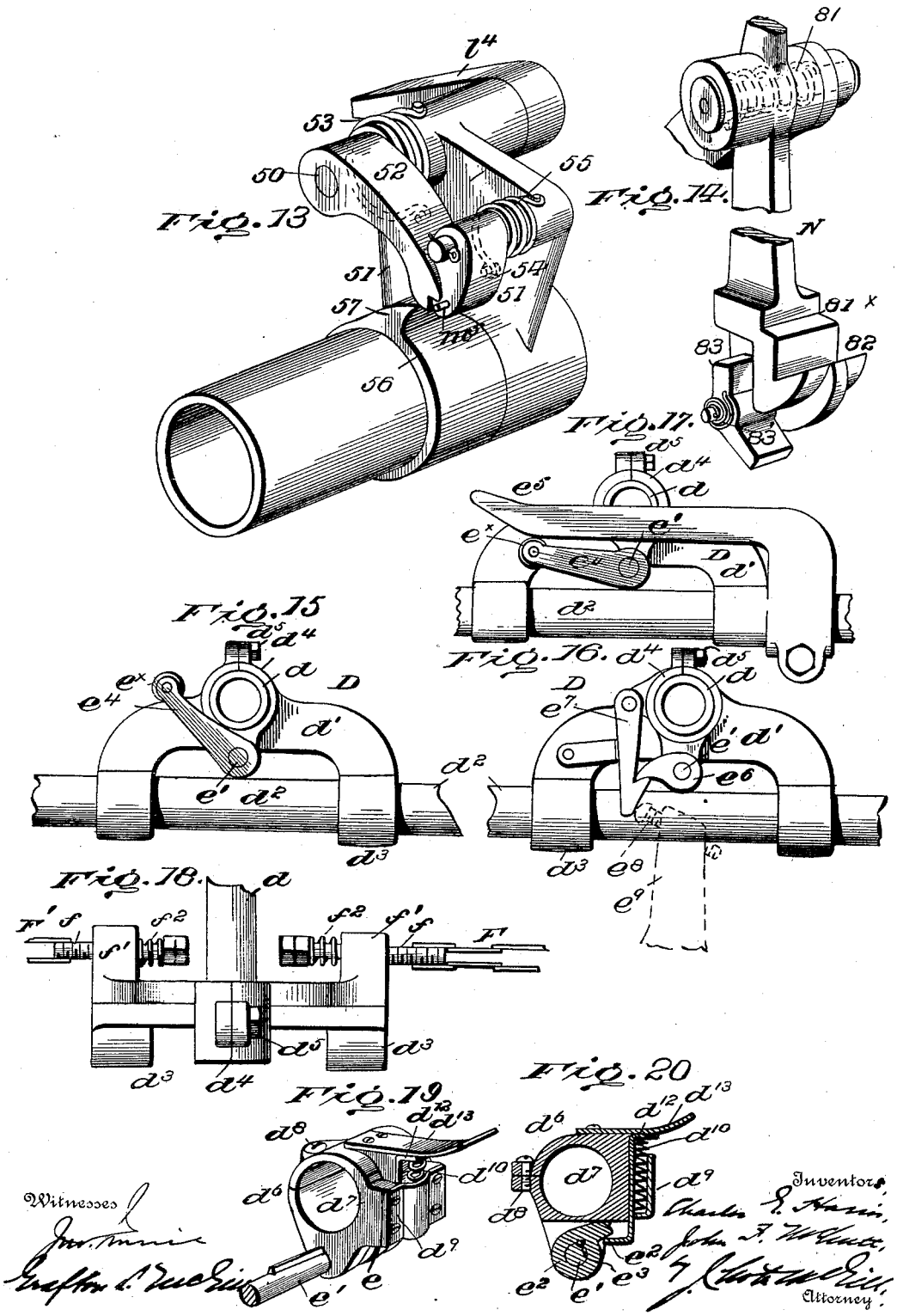

No. 686,728. Patented Nov. 19, 1901.
C. G. HARRIS & J. F. McNUTT.
NUMBERING MACHINE.
(Application filed June 27, 1898.)
(No Model.) 10 Sheets—Sheet 9.
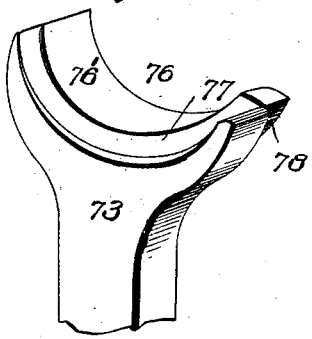
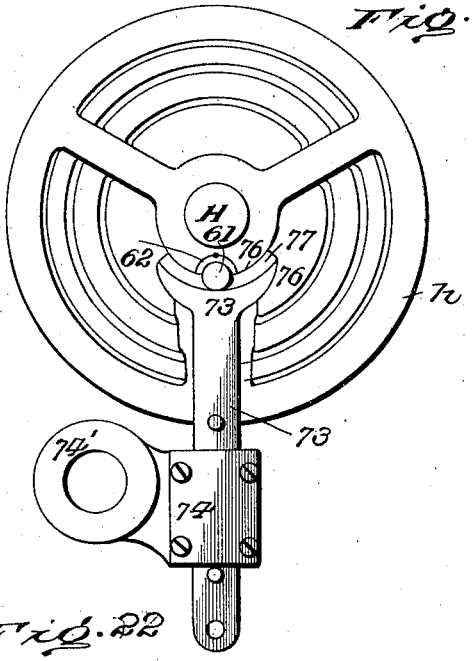
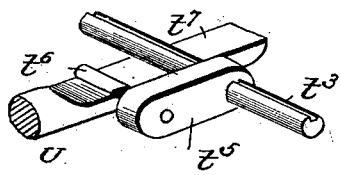
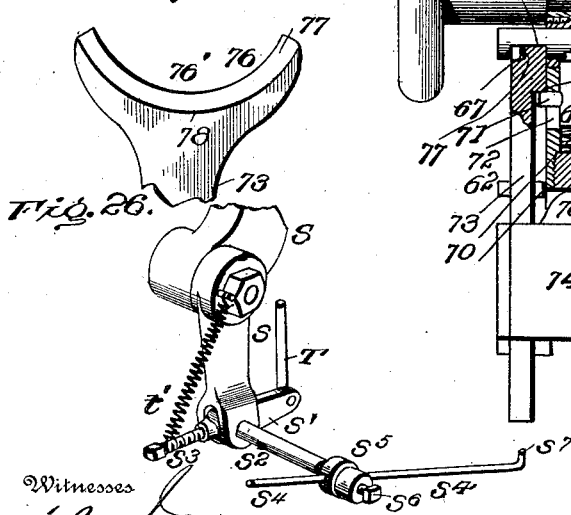
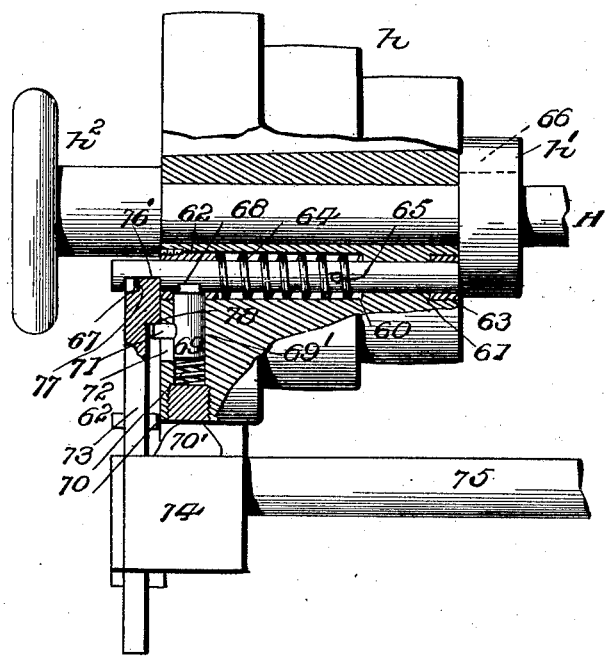

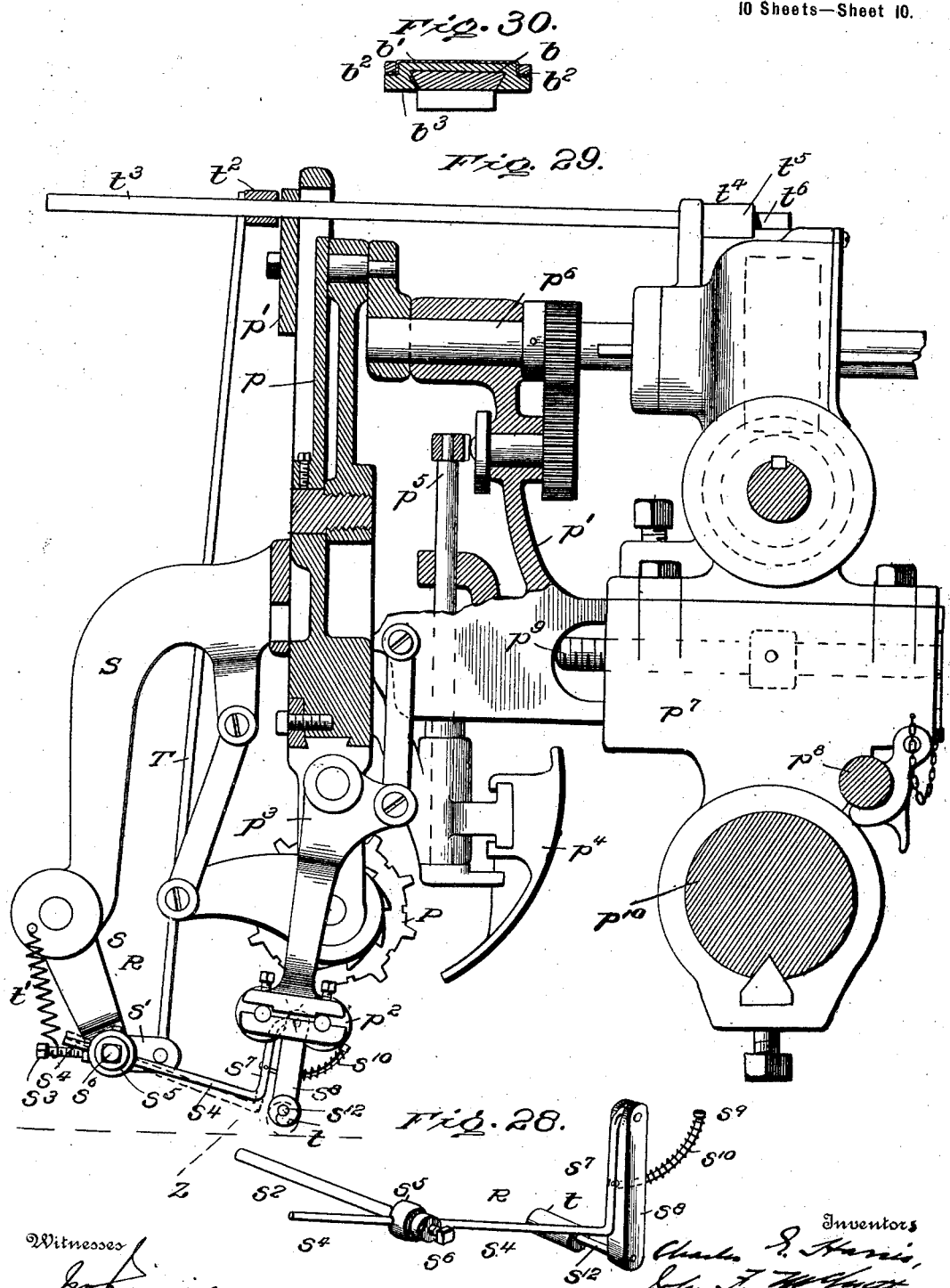

UNITED STATES PATENT OFFICE.

CHARLES GRANT HARRIS, OF NILES, AND JOHN FRANKLIN McNUTT, OF WARREN, OHIO, ASSIGNORS TO THE HARRIS AUTOMATIC PRESS COMPANY, OF NILES, OHIO, A CORPORATION OF OHIO.

NUMBERING-MACHINE.

SPECIFICATION forming part of Letters Patent No. 686,728, dated November 19, 1901.

Application filed June 27, 1898. Serial No. 684,527. (No model.)

*To all whom it may concern:*

Be it known that we, CHARLES GRANT HARRIS, residing at Niles, and JOHN FRANKLIN McNUTT, residing at Warren, in the county of Trumbull and State of Ohio, have invented certain new and useful Improvements in Numbering-Machines; and we do hereby declare the following to be a full, clear, and exact description of the invention, such as will enable others skilled in the art to which it appertains to make and use the same.

This invention contemplates certain new and useful improvements in numbering-machines, having reference to that class employed for consecutively numbering various kinds of blanks, such as bank-checks, cotton-checks, café-checks, or any blanks which are usually printed in sheets to be subsequently paged and bound together. The machine may also be used for consecutively numbering the lines of a page.

Heretofore the ordinary method in general vogue of printing numbers on blank spaces of checks and their stubs consists in placing the sheet composed of six checks and corresponding stubs into a single heading-machine, printing the number first on the check and then on the stub, the numbering-head being arranged to repeat each number once. In this way each check and its stub are numbered alike. The positioning of each sheet has to be done by hand, and the eye is the guide for insuring the accurate imprint of the type.

By our improvements the uncertainties of registering the blanks are entirely overcome, and the sheet to be numbered is mechanically fed with such accuracy that the blanks provided for the numbers are uniformly positioned directly beneath the numbering-heads, the feeding of the sheet being continued until all the number-spaces thereon have been printed upon.

The invention will be hereinafter fully set forth, and particularly pointed out in the claims.

Figure 2:
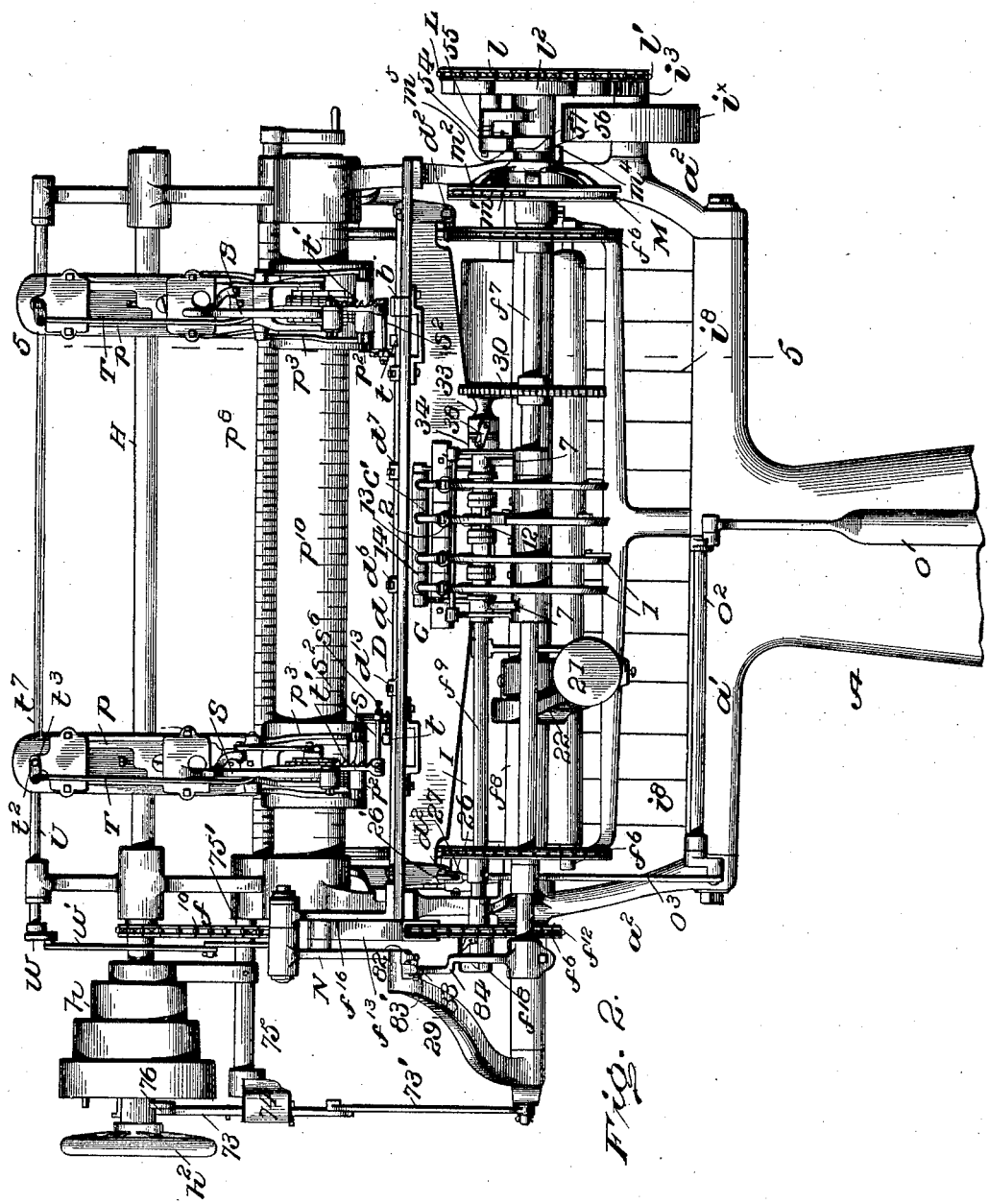
Figure 3:
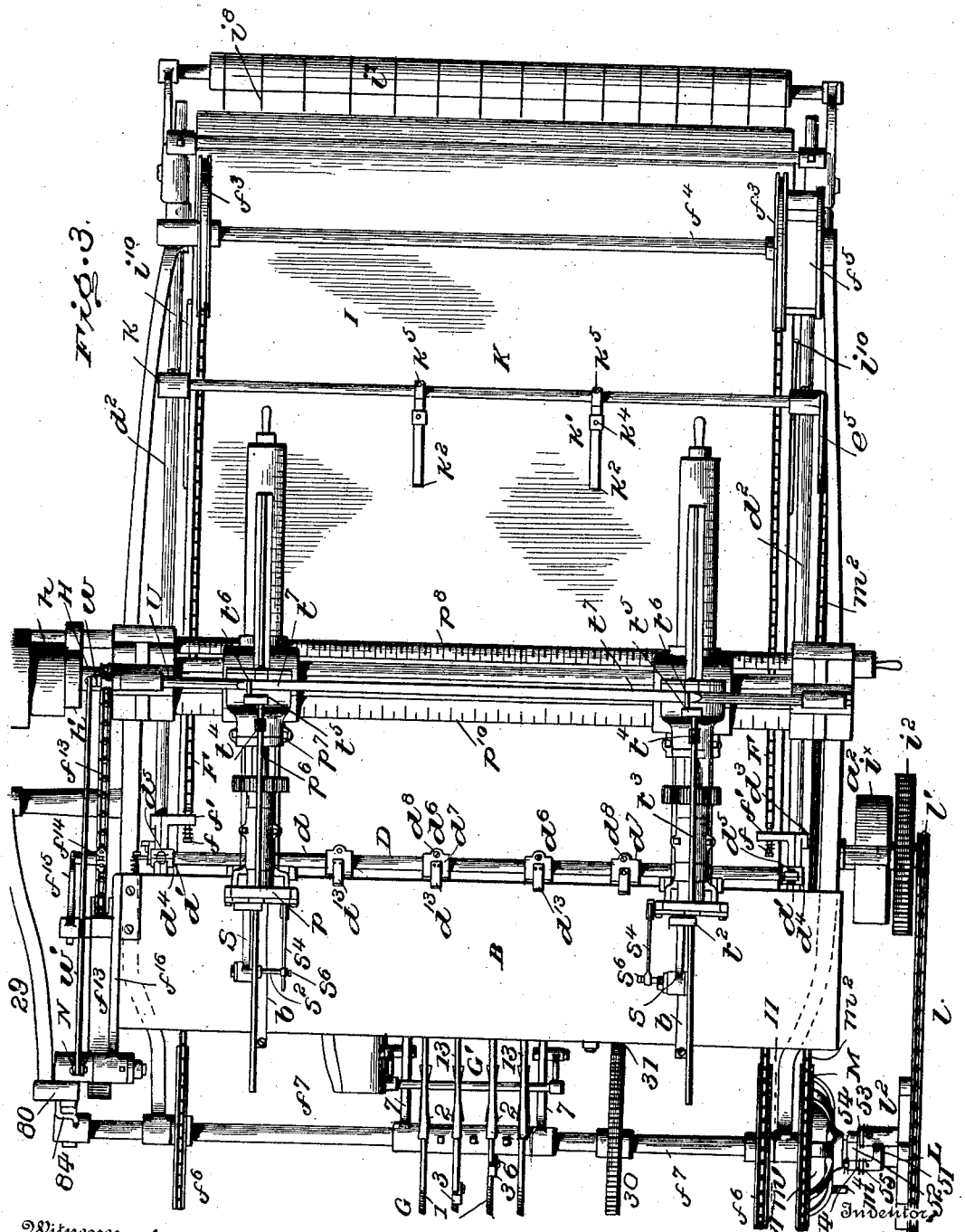
Figure 4:
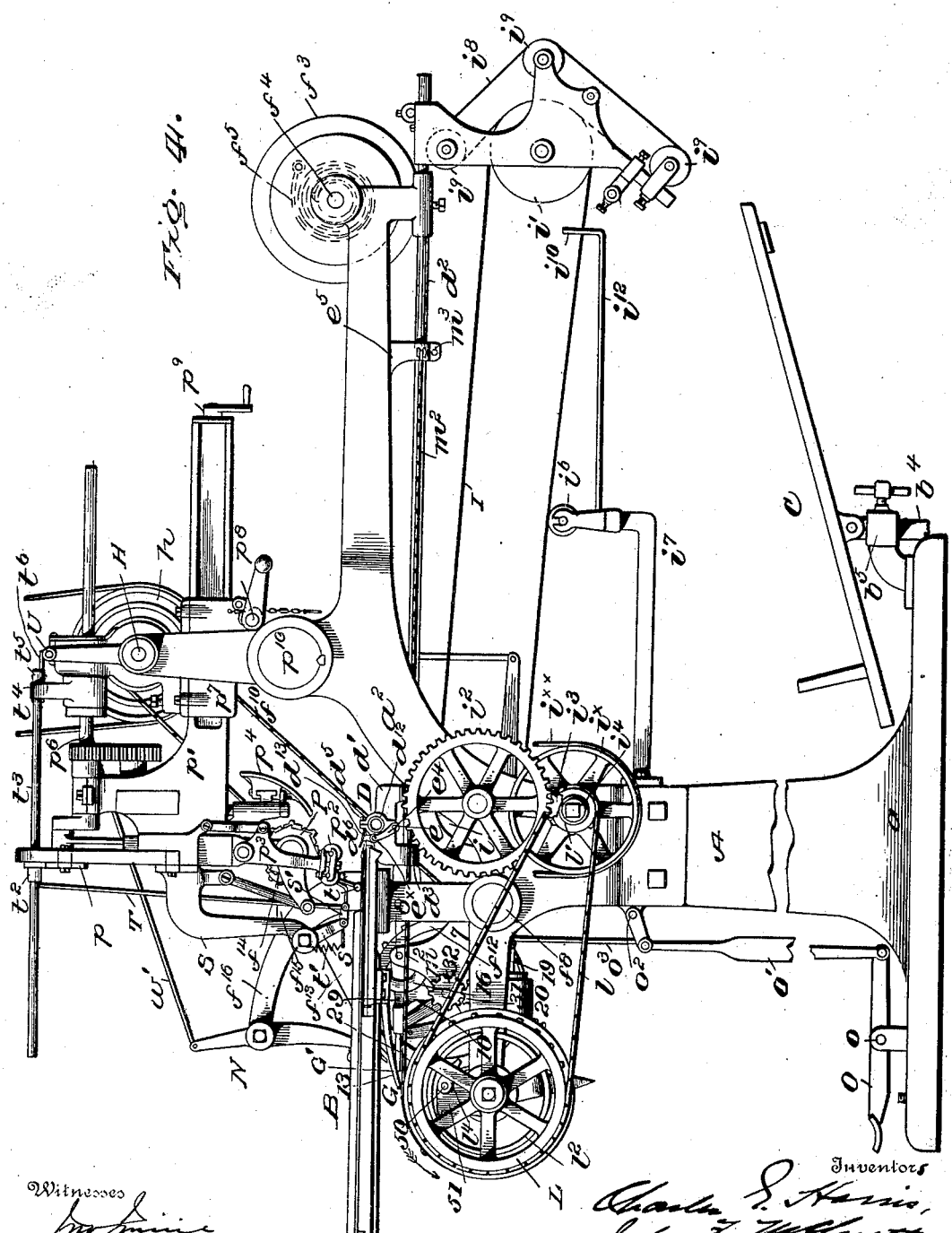
Figure 5:
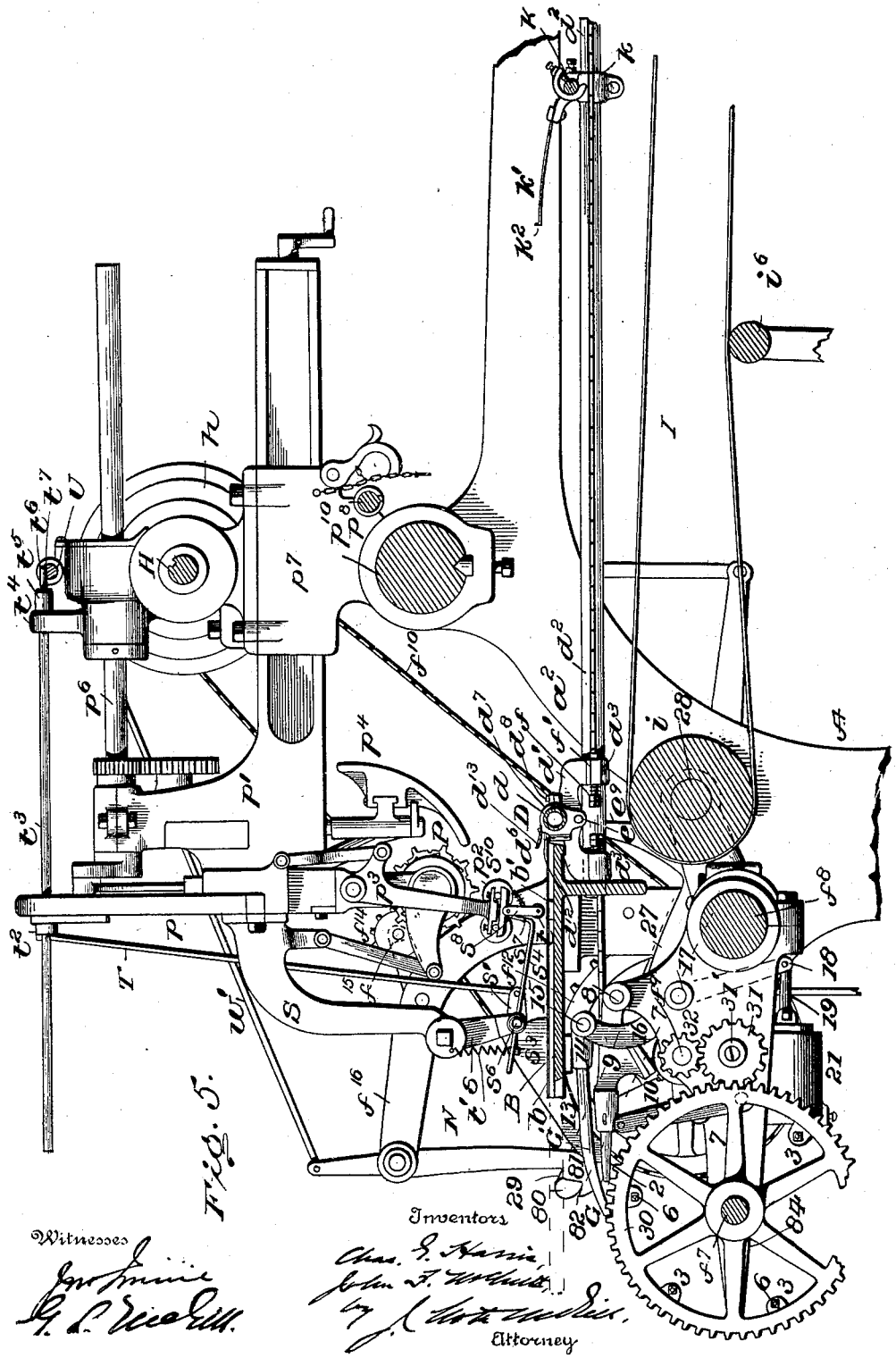
Figure 6:
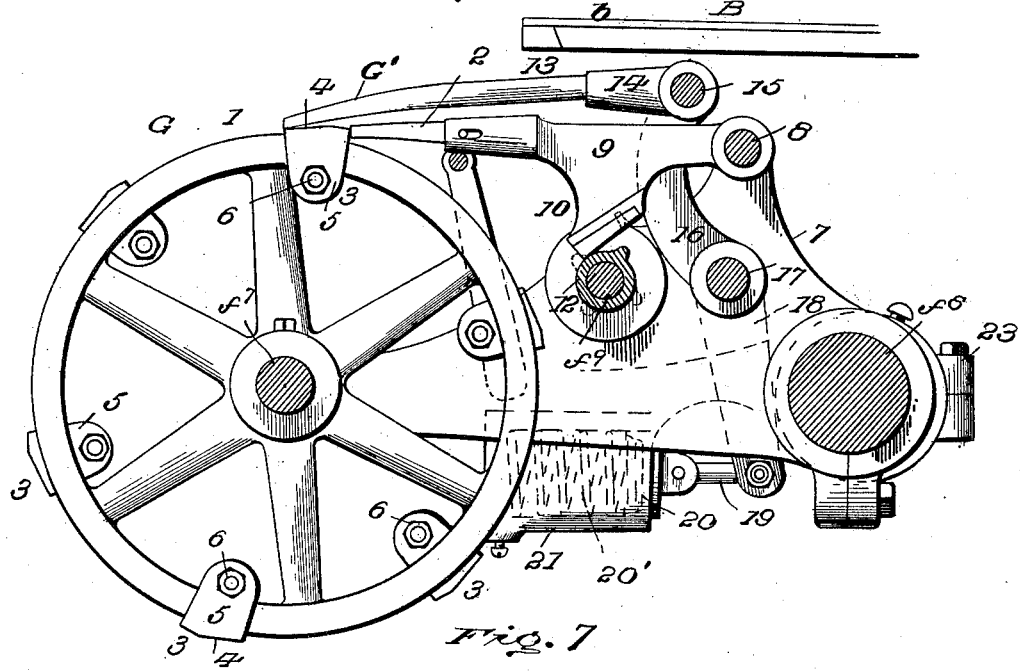
Figure 7:
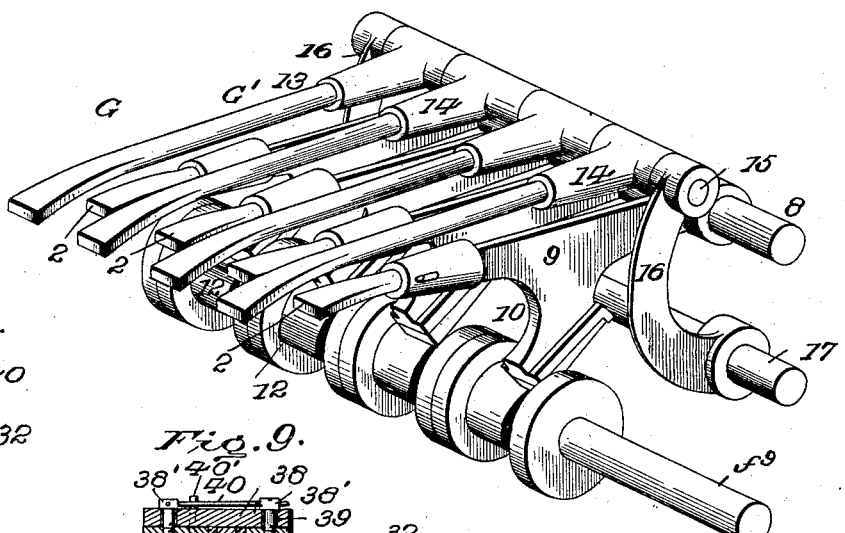
Figure 8:
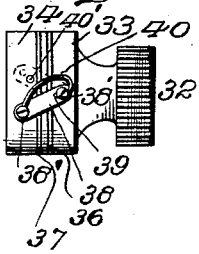
Figure 9:
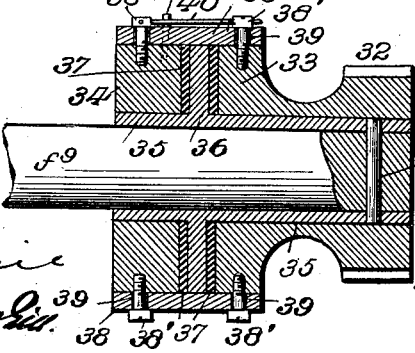
Figure 70:
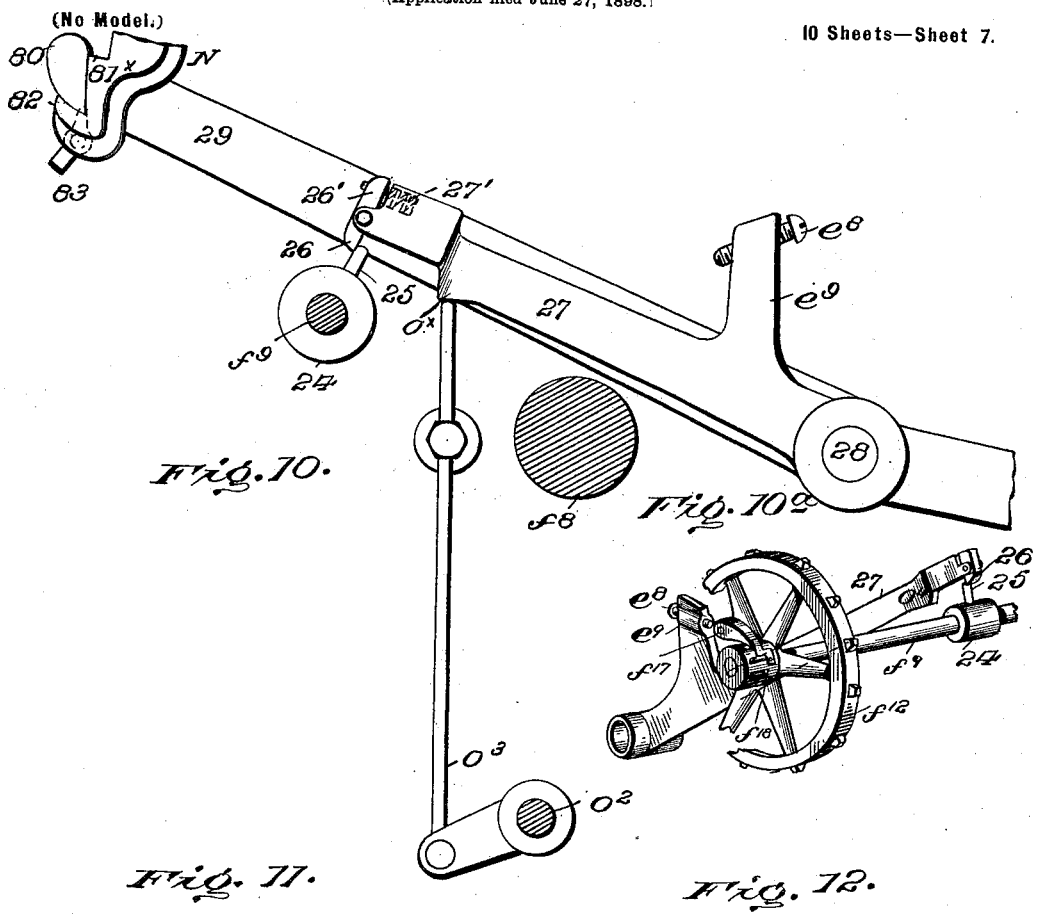
Figure 71:
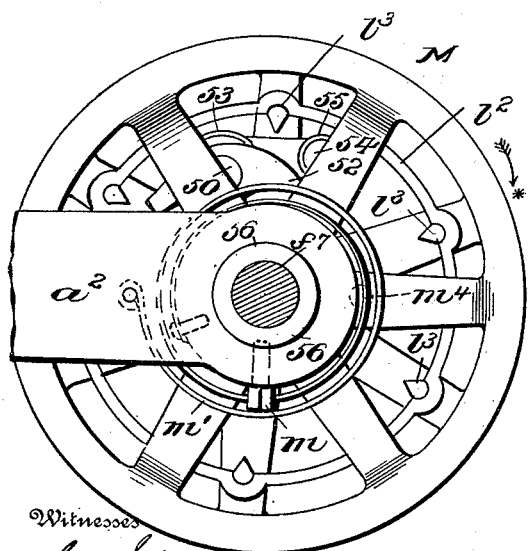
Figure 72:
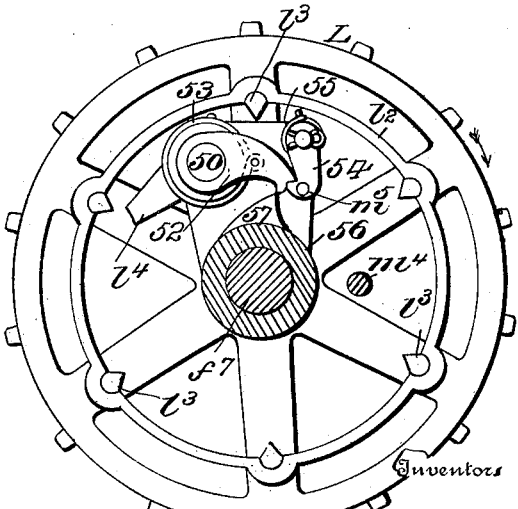

In the accompanying drawings, Figure 1 is a view in perspective of our improved machine. Fig. 2 is an end view. Fig. 3 is a top plan view. Fig. 4 is a side elevation. Fig. 5 is an enlarged vertical sectional view on line 5 5, Fig. 2. Fig. 6 is an enlarged view, in side elevation, of the stop mechanism. Fig. 7 is a view in perspective of portions of the latter. Fig. 8 is a plan view of a clutch-pinion. Fig. 9 is an enlarged longitudinal sectional view thereof. Fig. 10 is a view of portion of the clutch-operating lever and treadle mechanism. Fig. 10$^a$ is a view in perspective showing some of the parts of Fig. 10. Fig. 11 is a sectional view taken on line 11 11, Fig. 3. Fig. 12 is a face view of a clutch-wheel for reversing the motion of the stop mechanism. Fig. 13 is an enlarged view in perspective of details of said clutch. Fig. 14 is a view of the retaining-lever, parts being broken away. Figs. 15 and 16 are opposite end views of the gripper-carriage. Fig. 17 is a view similar to Fig. 15 and in addition the arm for effecting the opening of the grippers. Fig. 18 is a plan view of one end of the gripper-carriage. Fig. 19 is a view in perspective, and Fig. 20 a vertical sectional view of one of the grippers. Fig. 21 is an end view of the clutch-pulley. Fig. 22 is a side view thereof, a portion being in vertical section. Fig. 23 is a view in perspective of the clutch-operating slide. Fig. 24 is an inner face view thereof. Fig. 25 is an enlarged detail of a portion of the holdback mechanism. Figs. 26 and 28 are views in perspective of other portions of the holdbacks. Fig. 27 is a sectional view of a portion of one of the stop-wheels. Fig. 29 is an enlarged view, partly in section, of one of the numbering-head carriers and adjuncts. Fig. 30 is a cross-sectional view of one of the tympan-pads. Fig. 31 is a view of one of the arms for disengaging a sheet from the grippers.

Referring to the drawings, A designates a supporting-column; $a$, the base thereof; $a'$, a horizontal laterally-projecting bar at the top of said column, and $a^2$ side frames bolted to ends of the bar $a'$.

B is a table upon which the sheets to be numbered are designed to be placed. This table consists, preferably, of two flat plates or boards suitably united together. At its ends this table is supported by uprights of the side frames $a^2$. Extending over the inner section of this table are dovetailed bars $b$, upon which are adjustably arranged tympan-pads $b'$, preferably composed of paper and cardboard held in place by a surrounding frame $b^2$ on a block $b^3$. Across the table is located a metallic bar or strip $b^\times$, which is adjustable lengthwise of said table, so as to form a guide for the sheets of paper.

C is a table designed to receive the sheets after they are printed upon; but any other receptacle may be employed. This table is shown as consisting of a board pivotally mounted on the upper end of a post $b^4$, adjustably held in a bracket $b^5$, secured to base $a$.

D is a gripper-carriage which is caused to travel horizontally back and forth longitudinally of the machine between the side frames $a^2$, the forward movement being periodically arrested according to the predetermined spacing between the several imprints. A transverse rod $d$ is mounted at its ends in yokes $d'$. These yokes are movable on rods $d^2$, the ends $d^3$ of said yokes having tubular openings to accommodate said rods. The latter are disposed longitudinally of the machine parallel to the side frames and are supported by depending portions of the frames on a plane lower than the table B. The tubular portions $d^4$ of the yokes in which the rod $d$ is accommodated are split and held by bolts $d^5$. On this rod $d$ is a series of spaced-apart grippers $d^6$. Each gripper has a casing $d^7$, formed with an opening to accommodate rod $d$, and is split so that it can be adjusted on said rod and held tight by a screw $d^8$. To the front of this casing is secured a plate $d^9$, having a central bulged portion, in which is located a spiral spring $d^{10}$. This spring rests on the lower flanged end of plate $d^9$ and bears upwardly against the lower movable jaw $d^{12}$, normally holding the latter against the under side of the stationary jaw $d^{13}$. The latter consists of a plate attached to the top of casing $d^7$ and bent or curved upwardly at its outer end. The movable jaw is shown as consisting of a Z-shape plate inclosed by the plate $d^9$, against the top of which the upper horizontal flange of said jaw-plate is designed to rest when lowered. This is effected by the engagement with the lower horizontal flange of the movable jaw of a nose $e$, mounted on a rod $e'$, which is capable of being partly rotated. This nose is formed with a circular portion $e^2$, which fits on the said rod and is provided with a groove to accommodate a longitudinal rib or spline $e^3$. In this way the nose $e$ is capable of sliding on its rod when the gripper-casing is moved on rod $d$. The opening of the gripper is effected by an arm $e^4$ on one end of rod $e'$ causing the partial rotation of the latter upon a roller $e^\times$ thereof engaging an overhanging arm $e^5$, adjustably secured at one end to one of the rods $d^2$. This engagement occurs as the gripper-carriage reaches the rearward limit of its movement. By adjusting the position of the arm $e^5$ the opening of the grippers can be effected at any desired point. When the grippers are thus opened—that is, when the movable jaw is lowered by the partial rotation of rod $e'$—the parts are so held until the gripper-carriage reaches the forward limit of its movement—that is, with the grippers close up against the edge of table B—the upper stationary jaw overlapping said edge. This is effected by an arm $e^6$ on one end of rod $e'$ engaging with and being held by a spring-pressed pawl $e^7$ when said rod is turned by arm $e^5$. This pawl depends from one of the yokes $d'$. When the carriage is at the forward limit of movement, this pawl will be disengaged from arm $e^6$ when crowded rearward by the engagement therewith of a screw $e^8$ in an upwardly-projected post $e^9$, which is under the control of a foot-treadle. The release of arm $e^6$ frees the rod $e'$ and allows the springs $d^{10}$ to elevate the movable jaws to grip the edge of the paper.

F F' designate forward and rearward chains by which the gripper-carriage is reciprocated back and forth. The opposed ends of these chains are yieldingly connected to the yokes $d^2$ by bolts $f$, inserted through openings in ears $f'$ of each yoke. Coil-springs $f^2$ are interposed between these ears and the heads of the bolts. The forward ends of chains F are secured to the grooved peripheries of wheels $f^3$, fast on a shaft $f^4$, journaled in side frames $a^2$. A heavy coiled spring $f^5$, secured at its ends to one of these wheels and the adjoining side frame, constantly exerts a forward pull on the carriage. The rearward ends of chain F' are attached to the peripheries of wheels $f^6 f^6$, keyed on a shaft $f^7$, extended across the front of the machine and mounted at its ends in the side frames. The rearward rotation of shaft $f^7$ will effect the winding of chains F' on wheels $f^6$ and effect the return or rearward movement of the gripper-carriage, while the rearward rotation of shaft $f^4$, under the recoil of spring $f^5$, will by winding chains F on wheels $f^3$ effect the forward movement of the gripper-carriage. The terms "rearward" and "forward" as herein employed refer to the feeding and delivery ends of the machine, respectively.

G designates the stop mechanism by which the forward movement of the gripper-carriage under the action of the spring $f^5$ is periodically arrested until the full limit of such forward movement is reached. This mechanism comprises a series of wheels 1, fast on shaft $f^7$, mounted in side frames $a^2$, and a corresponding series of dead-stops 2. On the periphery of each wheel are one or more lugs 3, having each a tapered portion 4, side flange 5, a block 5', and a bolt 6, which firmly holds the block up against the side flange and inner surface of the wheel-rim. This block and the inner face of the lug are beveled to correspond to the dovetail formation of the wheel-rim. By loosening and tightening the bolts 6 each lug may be readily and easily adjusted and firmly secured at any point on the periphery of the rim of each wheel. At each end of this series of wheels 1 is a frame 7. These frames have tubular openings at their front ends to accommodate the shaft $f^7$, while at their rear ends they are fastened on a cross-rod $f^8$, mounted in the side frames $a^2$. The frames 7 support a cross-rod 8, on which are loosely hung a series of arms 9, formed with outer tubular ends, in which are fitted the plates constituting the dead-stops 2. These plates have outer flattened ends, with which the lugs 3 contact. Each arm 9 has a depending portion 10, which rests on cams 12, one cam being provided for each arm. These cams are fast on a shaft $f^9$, which is supported by the frames 7 and one of the side frames $a^2$, through which it is extended. The several cams 12 are differently positioned, so that but one arm of the series 9 will be operated upon at a time and each in its turn consecutively, beginning with the left-hand arm. As the arm of the dead-stop in engagement with one of the lugs of any one of the wheels 1 is elevated by its respective cam 12, the dead-stop will be disengaged therefrom and the shaft $f^7$ will rotate forward until arrested by another dead-stop of the series contacting with a lug on one of the other wheels. The rearward rotation of shaft $f^9$ is effected by a chain $f^{10}$, driven by the main operating-shaft H and engaging a sprocket-wheel $f^{12}$ on said shaft $f^9$. This chain is passed through a guard $f^{13}$ and is held taut by an idle wheel $f^{14}$, journaled on an arm $f^{15}$, projecting from an overhanging bracket $f^{16}$, fast on table B. The wheel $f^{12}$ carries a pawl $f^{17}$, which engages a ratchet-head $f^{18}$, fast on the end of shaft $f^9$. To lessen the force of the blows against the dead-stops and deaden the shock when the lugs strike such dead-stops, we employ a series of buffers G', located above the dead-stops 2. These buffers consist of rods 13, fitted in T-sleeves 14 and having outer flattened ends, which project over and beyond and nearly on line with the outer ends of dead-stops 2. The sleeves 14 are loose on a cross-rod 15, which is supported by curved arms 16, fast on a shaft 17, mounted in frames 7. To the lower end of an arm 18, fast at its upper end on shaft 17, is secured the outer end of the rod 19 of an air and spring pressed piston 20, movable in a cylinder 21, which is mounted on cross-rod $f^8$ by means of an arm 22, having a split-ring end 23. As a lug approaches its engaging dead-stop after the release of a previously-engaged lug such approaching lug first encounters the buffer, and the latter being forced rearward the air is compressed in cylinder 21. This compression of the air will absorb the force of the blow of the lug before the latter reaches the dead-stop. Just as this is about to occur the buffer will be forced out of engagement with the lug by riding on top of the dead-stop, with which latter the lug will strike without any great force. As the buffer is thus disengaged from the lug, it will be caused to assume its normal position under the action of the spring 20' on piston 20.

In practice it is essential that the series of lugs on the stop-wheels be set to represent the distances between the several imprints of the numbering-heads on each sheet being operated upon. For instance, if it is desired that the motion imparted to a sheet be such that the space between each impression shall be one-fourth of an inch one lug on the left-hand stop-wheel will be set at the starting-point and a lug on the next adjacent wheel will be one-fourth of an inch farther back, a lug on the third and fourth wheels each being correspondingly set. Then returning to the first or left-hand wheel a second lug will be set one-fourth of an inch farther back than the lug mentioned on the fourth wheel, and so on with the lugs of the other wheels, as before recited. In this way the pages of a book might have each of its lines numbered consecutively. Each time a lug is released from one of the dead-stops the gripper-carriage pulls the sheet forward until its movement is arrested by the next lug in order. By providing a series of four stop-wheels and periodically releasing the several dead-stops any desired spacing may be obtained and lugs of sufficient size to form rigid stops can be employed. Even where wide spacing—say four or five inches—is desired by the aid of the series of buffers which receive and deaden the blows the lugs can be brought into contact with the dead-stops without danger of displacing them. As each buffer is operated air is compressed in the cylinder 21. The cam 12 of the first or left-hand stop-wheel must always be in a position ready to release the dead-stop thereof when the machine is about to make the first impression. For this reason the pawl-and-ratchet connection between shaft $f^9$ and wheel $f^{12}$ is employed, so that said shaft may be turned independently of said wheel. On said shaft is fastened a collar 24, having a lug 25, which is designed to engage the hooked end 26 of an arm 27 when the latter is lowered. This hooked end preferably consists of a plate 26', pivoted in the end of the arm and normally under the tension of a coiled spring 27', located in a bore in the end of said arm. By thus enabling the hooked end of the arm 27 to yield all strain upon the parts is prevented. From arm 27 projects the post $e^9$, which effects the opening of the grippers, as before explained. The arm 27 is mounted on a shaft 28, having its bearings in one side frame $a^2$. Also fast on this shaft is a lever 29, which controls the clutch-pulley $h$ on the main operating-shaft H. When the machine is out of operation, lever 29 is lowered. This places the hooked end of arm 27 in line to be engaged by lug 25 when shaft $f^9$ is being rotated to return cams 12 to their starting-points. Now as the machine comes to a standstill at the delivery of a sheet the cams 12 on shaft $f^9$ may be in any position but the right one. The motion imparted to shaft $f^7$ in returning the stop-wheels 1 to their starting positions effects the turning of shaft $f^9$ rearward until lug 25 engages the hooked end of arm 27, whereupon the said shaft $f^9$ will be arrested, its cams 12 being then in proper position for the starting of the machine. When the lever 29 is raised to throw the machine into operation, the arm 27 is elevated clear of lug 25, and shaft $f^9$ is free to be actuated again by the rotation of its sprocket-wheel $f^{12}$. The turning of shaft $f^9$ by shaft $f^7$ is effected by means of a gear-wheel 30, fast on shaft $f^7$, engaging a pinion 31, mounted on a stud 31', extended from one of the frames 7, which pinion meshes with a clutch-pinion 32 on shaft $f^9$. This clutch-pinion is composed of two circular disks 33 and 34, the former being an enlarged elongation of the hub of the toothed portion of the pinion. These parts are fitted on a sleeve 35, which is fast on shaft $f^9$, being held, preferably, by a transverse pin 35'. This sleeve is formed with a circular flange 36, which fits between the two disks 33 and 34, washers 37 being interposed between said disks and flange. The two disks are united exteriorly by oppositely-disposed toggle-like plates 38, held to them by screws 38', said screws being passed through loose-fitting openings 39 in said plates. To the heads of these screws of one plate are secured the ends of a bowed spring 40, the tendency of which is to hold the two disks tight against the flange 36. When the shaft $f^9$ is being rotated rearward and the shaft $f^7$ forward, as when the gripper-carriage is carrying a sheet forward, the two disks of the clutch-pinion will be spread apart out of contact with flange 36 and will be revolved oppositely to the rotation of shaft $f^9$, on which they will revolve loosely. In this position the movement of the plates 38 is limited by one of them contacting with a pin 40', projecting from disk 34; but when the carriage is being returned to the front of the machine and the stop-wheels to their starting-points the reverse rotation of shaft $f^7$ will cause the two disks of the clutch-pinion to frictionally bind against the flange 36, and thus cause shaft $f^9$ to turn independently of its wheel $f^{12}$ and in the same direction as shaft $f^7$ until its motion is arrested by the lug 25 engaging with the hooked end of arm 27.

L is a wheel loosely journaled on one end of shaft $f^7$. With the lugs on its periphery engages a chain belt $l$, which is driven by a small sprocket-wheel $l'$, fast on shaft $i^4$. This shaft $i^4$ is mounted in the adjacent frame $a^2$, and on it is keyed a pulley $i^×$, which is driven by a belt $i^{××}$, leading from a counter-shaft (not shown) overhead. The wheel L is constantly rotated in one direction—outward, or "rearward," as the term is herein employed—as indicated by the arrows on Figs. 4 and 12. Upon the inner side of wheel L is a flange $l^2$, upon the inner surface of which are small triangular lugs $l^3$, which are designed to be engaged by a pawl $l^4$ of a clutch device carried by shaft $f^7$ when it is desired to reverse the rotation of said shaft to return the gripper-carriage and stop mechanism to the starting-points. The pawl $l^4$ is mounted fast on a short shaft 50, supported by an arm 51, keyed on shaft $f^7$. Also fast upon shaft 50 is an arm 52. A coiled spring 53 tends to normally hold the pawl $l^4$ outward in engagement with the lugs $l^3$. To a boss on arm 51 is pivoted a dog 54, the purpose of which is to engage the end of and hold arm 52, said dog being under the tension of a coiled spring 55. On shaft $f^7$ is a sleeve 56, having a lug 57, which when the pawl $l^4$ is released and in engagement with lugs $l^3$ is engaged by arm 52 and forces the latter outward into engagement with dog 54. The sleeve 56 is elongated so as to extend through an opening in the side frame $a^2$ and is held by a set-screw $m$. On this sleeve is a wheel M. This wheel has connected to its hub one end of a coiled spring $m'$, the tendency of which is to turn said wheel outward in the direction of arrow $\sharp$, Fig. 11. To the periphery of this wheel is secured one end of a chain $m^2$, the other end of which is connected to a depending portion $m^3$ of arm $e^5$. The position of wheel M is thus controlled by the position of said arm $e^5$—that is, when the latter is adjusted to regulate the point of release of the grippers along the length of the frame the wheel M must be correspondingly adjusted. From one side of the wheel M projects a lug $m^4$, which is designed to be engaged by a projecting lug $m^5$ of dog 54. When this occurs, the said dog will be forced to swing and release arm 52 and allow pawl $l^4$ to engage lugs $l^3$, and thus cause arm 51 and shaft $f^7$ to revolve outward with wheel L, thereby returning the gripper-carriage and stop-wheels to the starting-points. As the arm 52 engages the lug 57 it is again forced into engagement with dog 54, thereby disengaging pawl $l^4$ from lugs $l^3$. This occurs as the gripper-carriage and stop-wheels reach the starting-points. If a long sheet is being printed upon, the arm $e^5$ is moved rearward on rod $d^2$ and the pull on chain $m^2$ turns wheel M as against the tension of spring $m'$. Likewise for a short sheet the arm $e^5$ is moved toward the feeding end of the machine and the wheel M turns under the recoil of its spring until held by the fastening of arm $e^5$ on its rod. The chain $m^2$ is always held taut.

I designates an endless belt located between the side frames $a^2$ and passed over drums $i\,i'$, journaled in said side frames. The drum $i$ on one of its journals has a gear-wheel $i^2$, which is driven by a pinion $i^3$, fast on shaft $i^4$. The lower loop of the belt I is supported as against sagging by a small roll $i^6$, passed transversely thereunder and journaled in brackets $i^7$, projecting from column A, and is prevented from moving laterally by contact with the bent ends $i^{10}$ of arms $i^{12}$.

The belt I in delivering a sheet dropped thereon from the grippers coacts with a series of endless tapes $i^8$, bearing against drum $i'$ and passed over a series of rollers $i^9$, mounted in end extensions of frames $a^2$. A sheet carried against drum $i'$ by the belt and tapes will fall onto table C.

K is a rod extended transversely between the frames above belt I, being mounted at one end in a boss of arm $e^5$ and at its other end in a tubular bearing $k$, adjustable on the adjacent rod $d^2$. From this rod K project fingers $k'$, having outer upturned ends $k^2$. As the gripper-carriage reaches the rearward limit of its movement and the grippers are opened by the engagement of arm $e^4$ thereof with arm $e^5$, the edge of the sheet being in contact with the ends of said fingers, the sheet will be caused to drop from the grippers onto the endless belt. Each finger consists of a narrow plate having a slotted end held to a bracket $k^3$ by a screw $k^4$, said bracket being adjustably secured on rod K by a bolt $k^5$. Each bracket has an overhanging arm $k^6$ and a lower curved portion $k^7$, which fits up against the rod K.

The main operating-shaft H is mounted in uprights of the side frames, and loose upon it is the clutch-pulley $h$, which fits between a collar $h'$, fast on said shaft, and the sleeve of a hand-wheel $h^2$, also fast thereon. Within a longitudinal bore 60 of this pulley is located a bolt 61, which extends through bushings 62 63 in the ends of said bore. A spring 64, encircling this bolt and bearing against bushing 62 and a transverse pin 65, tends to force said bolt into a corresponding hole 66 in collar $h'$. When the pulley is so locked to the collar, the shaft H will be caused to revolve, a suitable driving-belt (not shown) being placed in engagement with any one of the steps of said pulley. The bolt 61 at its outer end has a groove 67, and a short distance inward is a recess 68. Into this recess when the bolt 61 is pulled outward, so as to disengage collar $h'$, is projected the reduced end of a locking-block 69. This block, which is preferably cylindrical, fits in a bore 69' of the pulley at right angles to the bore 60 and is forced outward by a spring 70, which is held in said bore 69' by a screw-plug 70'. A short pin 71 projects from block 69 outward through a slot 72 in the front face of the pulley.

73 is a vertically-movable slide, which consists of a plate connected at its lower end by a pitman 73' to the rear end of lever 29. This slide works in a guide-block 74, having at one side a tubular portion 74', which accommodates a short shaft 75, mounted at its inner end in a tubular bearing 75' of the side frame. On shaft 75, near the inner end thereof, is a collar $75^a$, to which is secured a metallic strap $76^b$, the upper end of which is lined with leather and encircles the collar $h'$ on the shaft H. This strap and collar act as a brake to stop shaft H after the clutch-pulley has been released. The upper end 76 of the sliding plate is flared laterally and formed with a concaved surface 76' and a cam-like shoulder 77, which is tapered throughout its length, terminating at one end flush with the outer face of the slide. On the inner face of the latter the flared end thereof is formed with a curved shoulder 78, which is designed to engage pin 71. When so engaged, the downward movement of the slide will withdraw block 69 out of engagement with bolt 61, which latter will be forced by its spring into engagement with collar $h'$. When the slide is moved upward, the cam-like shoulder 77 thereof will engage the groove 67 of the bolt 61, and as the pulley is revolving said bolt will be drawn outward by reason of the taper of said shoulder and before escaping from the slide will be locked by the spring-pressed block 69. Thus it will be seen that by operating lever 29 the clutch-pulley can be locked to and released from the main operating-shaft H.

The lever 29 at its outer end has a laterally-extended hook 80, which when said lever is raised will be engaged by the upper shoulder of a lower hooked end of an upright retaining-lever N, fulcrumed on bracket $f^{16}$. Inclosed within a boss on the end of this bracket is a spring 81, which tends to throw the lower long arm of lever N outward and hold the hooked end thereof against the hook 80 of lever 29. The lower end of the retaining-lever has an upper shoulder $81^\times$ and a lower shoulder 82, forming a double hook. Beneath the lower shoulder 82 to a flange of lever N is pivoted a dog 83, normally under the tension of a spring 83'. This dog is intended to receive the blow of an arm 84, fast on the end of shaft $f^7$, which will move the retaining-lever inward a distance sufficient to cause the hook of lever 29 to drop onto the lower shoulder 82. This will effect the unlocking of the clutch-pulley and cause the machine to stop. In the reversal of shaft $f^7$ the arm 84 thereof will strike dog 83 and turn the latter as against the tension of its spring without affecting the retaining-lever.

The machine is set in motion by the operator pressing his foot on a treadle O, fulcrumed on base $a$ and connected by a link $o'$ to one end of a rod $o^2$, mounted in bearings on the front of frame-bar $a'$. This rod has both of its ends cranked, and to its outer end is connected an upright rod $o^3$, which is passed through a guide $o^4$, projecting inwardly from one of the side frames $a^2$. At its upper end this rod $o^3$ contacts with a shoulder $o^\times$, formed on the under side of arm 27. By depressing the treadle the rod will raise arm 27, freeing the lug 25 of shaft $f^9$ of the hooked end of said arm and by elevating lever 29 onto shoulder 81 throw the clutch-pulley into engagement with the main operating-shaft.

The printing mechanism is in practice located above the inner section of the table B. Of course various kinds of such mechanism may be employed. In the use of numbering-heads any known form of revolving disks may be used, the numbers being capable of successive and sequential changes after each imprint or every second imprint, if required. It is essential that the printing mechanism in its operation bear a fixed relation to the movements of the sheet-conveyer. By this is meant that the printing mechanism or numbering-heads are so operated as to make an imprint or imprints upon the sheet each time the conveyer is arrested, the forward movements of the conveyer occurring between the several imprints and while the printing mechanism is on the recovery and return strokes. In the accompanying drawings we have illustrated numbering - heads so mounted as to have a vertical reciprocating movement.

P P designate the numbering-heads; $p$, the carriers therefor; $p'$, the frames for said carriers; $p^2$, the inking-rolls; $p^3$, the carriers for said rolls; $p^4$, the inking-plates; $p^5$, the shifters for said plates; $p^6$, crank-shafts for operating the carriers $p$ and shifters $p^5$, and $p^7$ the castings supporting the frames $p'$. All of these parts, including the threaded rods $p^8$ and $p^9$ for adjusting the positions of the numbering-heads, their frames, and castings, form the subject-matter of an application for patent filed by John F. McNutt, May 25, 1898, Serial No. 681,675, and need not be herein described in detail. It is sufficient to say that the main operating-shaft H is extended through the castings $p^7$ and effects the vertical reciprocation of the numbering-head carriers through the agency of crank-shafts $p^6$. The castings $p^7$ are mounted on a cross-rod $p^{10}$, supported by the side frames.

The locking of the clutch-pulley $h$ to shaft H simultaneously sets in operation the printing mechanism and the rotation of the shaft $f^9$, by which the several dead-stops are successively moved to allow the sheet-conveyer to travel forward. This forward movement occurs after each imprint of the numbering-heads and is arrested by the time the next imprint is about to occur.

R R designate pull-back devices for taking up slack in the paper and holding it taut and straight while receiving impressions. Each device is connected to the frame $p'$ of each numbering-head. To the lower end of an arm S, depending from said frame, is secured a bracket $s$, having a lower forked end, in which is located a lever $s'$, held fast on a shaft $s^2$, supported by said bracket, by as crew $s^3$, extended through the short arm of said lever. A rod $s^4$, extended inward at right angles to said shaft, is held on the latter by a boss $s^5$ and a set-screw $s^6$. The forward end $s^7$ of this rod is bent upwardly, and to its upper end is pivoted a depending link $s^8$. A curved arm $s^9$, secured to the upwardly-bent end $s^7$, is projected through a hole in said link and is encompassed by a coiled spring $s^{10}$, which serves to hold said link against the said end $s^7$. On a short rod $s^{12}$, projected laterally from the lower end of link $s^8$, is firmly secured a block of rubber $t$. To the outer end of screw $s^3$ is secured the lower end of a spiral spring $t'$, the upper end thereof being attached to bracket $s$. The office of this spring is to so hold the parts that the rubber $t$ will bear firmly on the paper. As each sheet is being pulled forward by the gripper-carriage the rubber and the link are pulled slightly away from the end of rod $s^4$ against the tension of spring $s^{10}$. The rubber constantly bears against the paper while the machine is in operation, and as each sheet is pulled forward any slack therein is removed and the paper is held taut and straight. To release the rubber when a sheet is to be adjusted to the grippers, we connect a rod T to the inner end of lever $s$, the upper end thereof being secured to a crank $t^2$, splined on a shaft $t^3$, having its bearings in the upper end of frame $p'$ and a block $t^4$, secured on casting $p^7$. On the rear end of this shaft $t^3$ is splined a second crank $t^5$, from which projects a pin $t^6$. This pin rests on the flattened portion $t^7$ of a shaft U, extended above and parallel with the main operating-shaft, being supported by extensions of the side frames. To a crank-arm $w$ on one end of this shaft U is connected one end of a rod $w'$, which at its other end is secured to the short arm of the retaining-lever N. When this lever is moved so as to pull on rod $w'$, shaft U is partly turned, and the edge of the flattened surface thereof engages the pin $t^6$, forcing it upward, and, through causing the partial rotation of shaft $t^3$, the outer end of crank $t^2$ is thrown up, elevating the rod T. This rod being connected to lever $s'$ will, through shaft $s^2$ and rod $s^4$, slightly raise the link and rubber. In starting the clutch-lever 29 is raised onto the upper shoulder $81^\times$ of the retaining-lever N. The lower end of the latter being thus moved inward, the rod $w'$ will turn shaft U so that the pins $t^6$ will rest on the flat surfaces thereof, thereby allowing the rubbers to lower onto the paper. The machine being started, (by the location of the hooked end of lever 29 on the upper shoulder of the retaining-lever,) the first impression made, and the grippers released, (which occurs by the elevation of arm 27, the screw of which crowds aside the dog $e^7$,) the sheet will be advanced one period by the rearward movement of the gripper-carriage. As the sheet is drawn forward the rubbers by their friction will cause the links to assume the position shown in dotted lines Z, all slack in the paper being thus removed and the sheet held taut and straight. This continues throughout the printing of the sheet. The two shoulders constituting the hooked end of the retaining-lever N are designed to allow the rubbers to remain on the sheet until the last impression has been made. As the gripper-carriage moves to the last printing position the arm 84 on the end of the stop-wheel shaft $f^7$ strikes the dog 83 in the lower end of lever N and forces the latter inward sufficient to cause the clutch-lever 29 to fall to the lower shoulder 82. This causes the disengagement of the clutch-pulley from shaft H, but does not remove the rubbers from the sheet. Before the clutch-pulley is disengaged the gripper-carriage reaches the rearward limit of movement. As it is moved to that position and as the sheet is released the arm 84 forces the lever N still farther inward, the hooked end of clutch-lever 29 engaging the point of the lower shoulder 82. The lever N upon being moved into this position draws outward rod $w'$ and effects the raising of the rubbers from the paper. They continue in this position while the gripper-carriage is being returned to its rearward position and a second sheet is being positioned to be printed upon and gripped by the grippers. The sheet being so positioned, the operator presses his foot on treadle O, effecting the elevation of the clutch-lever 29, which throws the clutch-pulley into engagement with shaft H, and the retaining-lever N is swung outward by its spring, and its upper hook $81^\times$ is moved beneath the hooked end of said lever 29 and holds the same until the arm 84 of the stop-wheel shaft again forces the retaining-lever N inward.

With what has been said the operation of our improved machine will be apparent, but may be briefly described as follows: A sheet is first positioned so as to be engaged by the grippers, which are then up against the inner edge of the extension of table B. The clutch-pulley $h$ being locked to shaft H, the rotation of the latter will cause the descent of the numbering-heads against the sheet and will also rotate the shaft $f^9$. As soon as the first imprint has been made the cam 12 of the dead-stop engaging the left-hand stop-wheel frees the latter, and the gripper-carriage is moved forward until arrested by the second stop-wheel and its respective dead-stop. During the forward movement of the gripper-carriage the numbering-heads are elevated from the sheet, and the carriage is arrested in time for such sheet to receive the second imprint of said heads. Thus the carriage is periodically arrested to receive the imprints and is released between such imprints, so that the sheet may be advanced the predetermined distance. This is continued until the sheet has been printed upon the desired number of times, the latter being regulated mainly by the spaces intervening between the lugs of the several stop-wheels. As the gripper-carriage reaches the rearward limit of its movement the grippers are opened and the sheet drops onto the belt I, by which it is conveyed to table C. As the sheet is thus dropped the clutch-pulley is disengaged from the operating-shaft, and then the rubbers are elevated from the paper. Then the rotation of the stop-wheel shaft is reversed by its clutch engaging the sprocket-wheel L, and the stop-wheels are returned to the starting-point, and at the same time the gripper-carriage is returned to the rear edge of the feed-table. The reverse movement of the stop-wheel shaft effects the rotation of the cam-carrying shaft $f^9$, returning the cams to the starting-point, so that as the first imprint is made the first or left-hand stop-wheel will be operated. After a second sheet is positioned the depression of the foot-treadle will effect the release of the grippers, causing them to grip the sheet, and at the same time the clutch-pulley is again locked to the operating-shaft, and the operation described is repeated.

It will be understood that although the means shown and described for imparting to the sheet-conveyer a forward movement comprehends the use of springs, yet the invention is not restricted in this respect, nor is it confined to the exact form of embodiment used as illustrative thereof in the drawings and foregoing specification.

We claim as our invention—

1. In a printing-machine, the combination of vertically-reciprocating printing mechanism, a conveyer for moving the article to be printed upon across the printing-field in movements successive to the several imprints, adjustable means for arresting and controlling the extent of each of such movements relatively to the other movements, and means for automatically returning the conveyer to its starting-point when the full predetermined limit of its movement is reached, substantially as set forth.

2. In a numbering-machine, the combination of vertically-reciprocating printing mechanism, a conveyer for moving the article to be printed upon across the printing-field, stop mechanism for arresting the movements of such conveyer successively to each imprint, means for adjusting such stop mechanism for regulating the extent of any one or more of said movements, and means for automatically returning the conveyer to its starting-point when the full or predetermined limit of its successive movements is reached, substantially as set forth.

3. In a printing-machine, the combination of vertically-reciprocating printing mechanism, a feed-table, a conveyer for moving the article to be printed upon across the printing-field in movements successive to the several imprints, frictional devices normally bearing on said table, adjustable means for arresting and controlling the extent of each movement of the conveyer relatively to the other movements, and means for automatically returning the conveyer to its starting-point when the full predetermined limit of its movement is reached, substantially as set forth.

4. In a printing-machine, the combination of vertically-reciprocating printing mechanism, a feed-table, a conveyer for moving the article to be printed upon across the printing-field in movements successive to the several imprints, frictional devices normally bearing on said table, adjustable means for arresting and controlling the extent of each movement of the conveyer, means for automatically returning the conveyer to its starting-point when the full predetermined limit of its movement is reached, and means for elevating said frictional devices as said conveyer reaches said limit of movement, substantially as set forth.

5. A printing-machine having reciprocating printing mechanism, a forwardly-impelled sheet-conveyer, a series of stop-wheels operated by said conveyer, means engaging said stop-wheels for arresting said conveyer prior to the imprints of such mechanism and means for releasing said stop-wheels after each imprint, as set forth.

6. A printing-machine having reciprocating printing mechanism, a spring-impelled sheet-conveyer, a series of dead-stops, a series of spaced-apart stop-lugs movable in line of contact with said dead-stops, said stop-lugs being so arranged that but one at a time will be in engagement with one of said dead-stops, each of the latter being engaged consecutively by different stop-lugs, and means for releasing the engaged stop-lug, as set forth.

7. A printing-machine having reciprocating printing mechanism, a spring-impelled sheet-conveyer, a series of wheels having lugs on their peripheries, a corresponding series of dead-stops designed to be engaged by said lugs, said wheels being operated by said conveyer, and means for disengaging said dead-stops from said lugs, as set forth.

8. A printing-machine having reciprocating printing mechanism, a spring-impelled sheet-conveyer, a series of stops for periodically arresting said conveyer, said stops being spaced apart to regulate the spaces between the imprints of said mechanism, and means for releasing said conveyer after each imprint, as set forth.

9. A printing-machine having reciprocating printing mechanism, a spring-impelled sheet-conveyer, a series of wheels having spaced-apart lugs on their peripheries, a series of dead-stops corresponding to said wheels designed to be engaged by said lugs, means for operating said dead-stops to release said wheels, and connections between said conveyer and wheels, as set forth.

10. A printing-machine having reciprocating printing mechanism, a spring-impelled sheet-conveyer, a series of wheels having spaced-apart stop-lugs on their peripheries, a series of dead-stops corresponding to said wheels, said stop-lugs being movable in line of contact with said dead-stops and so arranged on the peripheries of the several wheels that but one at a time will be in engagement with one of said dead-stops, each of the latter being engaged consecutively by different stop-lugs, and means for releasing the engaged stop-lugs, substantially as set forth.

11. A printing-machine having a spring-impelled gripper-carriage, means for periodically arresting said carriage and then releasing the same until the full limit of movement thereof is reached, and means for disengaging the grippers at the end of said movement, as set forth.

12. A printing-machine having vertically-reciprocating printing mechanism, a horizontally-movable spring-impelled gripper-carriage, means for arresting said carriage during each imprint of said mechanism, means for releasing the same after each imprint, until the full limit of movement of said carriage is reached, and means for disengaging the grippers at the end of said movement, as set forth.

13. A printing-machine having vertically-reciprocating printing mechanism, a horizontally-movable spring-impelled gripper-carriage, means for arresting said carriage during each imprint of said mechanism, means for releasing the same after each imprint, until the full limit of movement of said carriage is reached, means for opening and holding the grippers at the end of said movement, means for returning said carriage to its starting-point, and means for closing said grippers when the carriage is at such starting-point, as set forth.

14. A printing-machine having a horizontally-movable spring-impelled sheet-conveyer, a rotary shaft to which said conveyer is connected, stop mechanism under the control of said shaft for periodically arresting the forward movement of said conveyer and means for automatically reversing the rotation of said shaft when said conveyer reaches the limit of its spring-impelled movement, substantially as set forth.

15. A printing-machine having a horizontally-movable spring-impelled sheet-conveyer, a rotary shaft to which said conveyer is connected, a wheel loose on said shaft, means for constantly rotating said wheel, and a clutch on said shaft designed to be thrown into engagement with said wheel when said conveyer reaches the limit of its spring-impelled movement, as set forth.

16. A printing-machine having a horizontally-movable spring-impelled sheet-conveyer, a rotary shaft to which said conveyer is connected, stop mechanism under the control of said shaft for periodically arresting the forward movement of said conveyer, a wheel loose on said shaft, means for constantly rotating said wheel, and a clutch on said shaft designed to be thrown into engagement with said wheel when said conveyer reaches the limit of its forward movement, whereby it will be returned to its starting-point, as set forth.

17. The combination with the spring-impelled sheet-conveyer, of a rotary shaft to which said conveyer is connected, a series of wheels fast on said shaft having stop-lugs on their peripheries, a corresponding series of dead-stops for engaging said stop-lugs, means for releasing said dead-stops, and means for reversing the rotation of said shaft when said conveyer reaches the limit of its forward movement, substantially as set forth.

18. A printing-machine having a horizontally-movable spring-impelled sheet-conveyer, a rotary shaft to which said conveyer is connected, a constantly-rotated wheel loose on said rotary shaft, a clutch fast on said shaft, and means for throwing said clutch into engagement with said wheel, for reversing the rotation of said shaft, when said conveyer reaches the limit of its forward movement, substantially as set forth.

19. A printing-machine having a horizontally-movable spring-impelled sheet-conveyer, a rotary shaft to which said conveyer is connected, a constantly-rotated wheel loose on said rotary shaft having inwardly-projecting lugs, and a clutch comprising a spring-pressed pawl designed to engage said lugs, and means for holding said pawl out of engagement with said lugs, substantially as set forth.

20. A printing-machine having a horizontally-movable spring-impelled sheet-conveyer, a rotary shaft to which said conveyer is connected, a constantly-rotated wheel loose on said rotary shaft having inwardly-projecting lugs, and a clutch comprising a spring-pressed pawl designed to engage said lugs, an arm connected to said pawl, a spring-pressed dog designed to hold said arm, and means for moving said arm into engagement with and releasing it from said dog, substantially as set forth.

21. A printing-machine having a horizontally-movable spring-impelled sheet-conveyer, a rotary shaft to which said conveyer is connected, a constantly-rotated wheel loose on said rotary shaft having inwardly-projecting lugs, and a clutch comprising a spring-pressed pawl designed to engage said lugs, a short shaft to which said pawl is secured, an arm also fast on said short shaft, a spring-pressed dog designed to hold said arm, a cam for forcing said arm into engagement with said dog, and means for moving said dog away from said arm, substantially as set forth.

22. The combination with the spring-impelled sheet-conveyer, of a rotary shaft to which said conveyer is connected, a spring-impelled wheel on said shaft, a lug projecting from said wheel, a constantly-operated wheel loose on said shaft, and a clutch fast on said shaft designed to be released by said lug of said spring-impelled wheel when said conveyer reaches the full limit of its forward movement, whereby the rotation of said shaft will be reversed by the said constantly-operated wheel, substantially as set forth.

23. The combination with the spring-impelled sheet-conveyer, of a rotary shaft to which said conveyer is connected, a spring-impelled wheel, a lug projecting from said wheel, a constantly-operated wheel loose on said shaft, an arm fast on said shaft, a spring-pressed pawl mounted on said arm designed to engage said constantly-operated wheel, a second arm fast on the pivot-shaft of said pawl, a spring-pressed dog pivoted on the first-mentioned arm and designed to be engaged by and hold said second arm, and a lug projecting from said dog designed to be engaged by said lug of said spring-impelled wheel, substantially as set forth.

24. A printing-machine having a spring-impelled sheet-conveyer, a series of concentrically-arranged stop-lugs rotated by said conveyer, a corresponding series of dead-stops with which said stop-lugs are designed to engage, and yielding buffers with which said stop-lugs contact before engaging said dead-stops, substantially as set forth.

25. A printing-machine having a spring-impelled sheet-conveyer, a series of wheels rotated by said conveyer having spaced-apart stop-lugs on their peripheries, a series of dead-stops with which said stop-lugs are designed to engage, and a series of yielding buffers corresponding to said dead-stops with which said stop-lugs contact before engaging said dead-stops, substantially as set forth.

26. A printing-machine having a spring-impelled sheet-conveyer, a series of wheels rotated by said conveyer having spaced-apart stop-lugs on their peripheries, a series of dead-stops with which said stop-lugs are designed to engage, and a series of buffers having their outer ends in advance of said dead-stops, said buffers being pivotally mounted, and a yielding device designed to receive the blow of said stop-lugs against said buffers, substantially as set forth.

27. A printing-machine having a spring-impelled sheet-conveyer, a series of wheels rotated by said conveyer having spaced-apart stop-lugs on their peripheries, a series of dead-stops with which said stop-lugs are designed to engage, and a series of buffers consisting of rods having their outer ends in advance of said dead-stops, a shaft supporting said rods, a piston and cylinder therefor, and a connection between said piston and said shaft, substantially as set forth.

28. A printing-machine having a spring-impelled sheet-conveyer, a series of wheels, operated by said conveyer, having stop-lugs on their peripheries, frames adjacent said wheels having a cross-rod, a series of dead-stops pivotally secured on said cross-rod, designed to be engaged by said stop-lugs, a shaft also supported by said frames, a second rod mounted on said shaft, a series of buffers pivotally mounted on said second rod and projected in advance of said dead-stops, a piston and cylinder therefor, an arm secured to said shaft and connected to said piston, and means for releasing said dead-stops, substantially as set forth.

29. The combination with the spring-impelled sheet-conveyer, of a rotary shaft to which said conveyer is connected, and stop mechanism comprising a series of wheels fast on said shaft having stop-lugs on their peripheries, and means designed to be engaged by said stop-lugs for arresting said conveyer, each of said wheels having dovetailed rims, and each of said lugs consisting of an angular plate, a block, and a holding-screw therefor, said plate and block having tapered surfaces to conform to the taper of said wheel-rim, substantially as set forth.

30. The combination with the spring-impelled sheet-conveyer, of a rotary shaft to which said conveyer is connected, and stop mechanism comprising a series of wheels fast on said shaft having stop-lugs on their peripheries, a series of pivoted arms having plates projecting therefrom, forming dead-stops, with which said stop-lugs are designed to engage, and means for moving said arms, substantially as set forth.

31. The combination with the spring-impelled sheet-conveyer, of a rotary shaft to which said conveyer is connected, and stop mechanism comprising a series of wheels fast on said shaft having stop-lugs on their peripheries, a series of pivoted arms having depending portions, and outwardly-projecting plates, and a second shaft having cams for engaging said depending portions, substantially as set forth.

32. The combination with the spring-impelled sheet-conveyer, of a rotary shaft to which said conveyer is connected, and stop mechanism comprising a series of wheels fast on said shaft having stop-lugs on their peripheries, a series of depending arms having depending portions, and outwardly-projecting plates, a second shaft beneath said arms having a series of cams thereon differentially arranged, whereby each arm will be successively acted upon by said cams, substantially as set forth.

33. The combination with the spring-impelled sheet-conveyer, of a rotary shaft to which said conveyer is connected, and stop mechanism comprising a series of wheels fast on said shaft having stop-lugs on their peripheries, a series of pivoted arms having outwardly-projecting plates, said stop-lugs being so arranged that but one at a time will be in engagement with one of said plates, a second shaft beneath said arms having a series of differentially-arranged cams for operating each of said arms successively, substantially as set forth.

34. The combination with the spring-impelled sheet-conveyer, of a rotary shaft to which said conveyer is connected, and stop mechanism comprising a series of wheels fast on said shaft and having stop-lugs on their peripheries, a series of pivoted arms having plates forming dead-stops, a corresponding series of pivoted rods located above, and extended in advance of, said plates, a movable support for said rods, a cylinder and a spring-pressed piston therein having its rod connected to said support, substantially as set forth.

35. The combination with the spring-impelled sheet-conveyer, of a rotary shaft to which said conveyer is connected, and stop mechanism comprising a series of wheels fast on said shaft having stop-lugs on their peripheries, a series of pivoted arms having plates forming dead-stops, a corresponding series of rods located above, and extended in advance of, said plates, a second shaft having arms secured thereon, a rod supported by said arms having sleeves in which said rods are secured, an arm fast on said second shaft, a cylinder, and a spring-pressed piston therein having its rod connected to the last-mentioned arm, substantially as set forth.

36. The combination with the spring-impelled sheet-conveyer, of a rotary shaft to which said conveyer is connected, and stop mechanism comprising a series of wheels fast on said shaft having stop-lugs on their peripheries, frames adjacent to said wheels having a cross-rod, a series of dead-stops pivoted on said cross-rod and designed to be engaged by said stop-lugs, a second rotary shaft extended between said frames, a series of cams thereon for engaging said dead-stops and releasing them from said stop-lugs, a series of buffers in advance of said dead-stops designed to be engaged by said stop-lugs, and a spring-pressed piston designed to relieve said buffers and return them to their normal positions, substantially as set forth.

37. The combination with the spring-impelled sheet-conveyer, of a rotary shaft to which said conveyer is connected, and stop mechanism comprising a series of wheels fast on said rotary shaft having stop-lugs on their peripheries, a series of dead-stops designed to be engaged by said stop-lugs, a second shaft having a series of differently-arranged cams for successively operating each of said dead-stops, means for rotating said second shaft independently connected thereto, a clutch connection between both of said shafts, and means for reversing the rotation of said rotary shaft, whereby said conveyer and stop-wheels will be returned to their starting-points, and said second shaft will be rotated independently of its driving means, substantially as set forth.

38. The combination with the spring-impelled sheet-conveyer, of a rotary shaft to which said conveyer is connected, and stop mechanism comprising a series of wheels fast on said rotary shaft having stop-lugs on their peripheries, a series of dead-stops designed to be engaged by said stop-lugs, a second shaft having a series of differently-arranged cams for successively operating each of said dead-stops, means for rotating said second shaft independently connected thereto, gearing between both of said shafts comprising a clutch-pinion, and means for reversing the rotation of said rotary shaft, whereby said conveyer and stop-wheels will be returned to their starting-points, and said second shaft will be rotated independently of its driving means, substantially as set forth.

39. The combination with the spring-impelled sheet-conveyer, of a rotary shaft to which said conveyer is connected, and stop mechanism comprising a series of wheels fast on said rotary shaft having stop-lugs on their peripheries, a series of dead-stops designed to be engaged by said stop-lugs, a second shaft having a series of differently-arranged cams for successively operating each of said dead-stops, means for rotating said second shaft independently connected thereto, a clutch-pinion normally loose on said second shaft, a gear-wheel fast on said rotary shaft in gear with said clutch-pinion, and means for reversing the rotation of said rotary shaft when said conveyer reaches the limit of its forward movement, substantially as set forth.

40. In a printing-machine having stop mechanism comprising a rotary shaft having a gear-wheel thereon, and means for arresting the rotation of said shaft, a second shaft designed to release said arresting means, means for rotating said second shaft, a flange on said second shaft, and a clutch-pinion in gear with said gear-wheel having two disks on opposite sides of said flange, and toggle-like connections between said disks, substantially as and for the purpose stated.

41. In a printing-machine having stop mechanism comprising a rotary shaft having a gear-wheel and a series of concentrically-arranged stop-lugs, a series of dead-stops designed to be engaged by said stop-lugs, a second shaft having cams for releasing said dead-stops, means for rotating said second shaft, a flange fast on the latter shaft, a clutch-pinion thereon having two disks on opposite sides of said flange, plates pivotally secured to said disks, a stop on one of said disks, and a spring tending to hold said disks against said flange, said clutch-pinion being geared to said gear-wheel, substantially as set forth.

42. The combination with the spring-impelled sheet-conveyer, of a rotary shaft to which said conveyer is connected, a gear-wheel and a series of wheels fast on said shaft, said latter wheels having lugs on their peripheries, a series of dead-stops designed to be engaged by said lugs, a second shaft having a series of cams for releasing said dead-stops, and also having a drive-wheel, and a pawl-and-ratchet connection therewith, a clutch-pinion on said second shaft in gear with said gear-wheel, and means for reversing the rotation of said rotary shaft when said conveyer reaches the limit of its forward movement, substantially as set forth.

43. The combination with the spring-impelled sheet-conveyer, of a rotary shaft to which said conveyer is connected, a gear-wheel and a series of wheels fast on said shaft, said latter wheels having lugs on their peripheries, a series of dead-stops designed to be engaged by said lugs, a second shaft having a series of cams for releasing said dead-stops, and also having a drive-wheel, and a pawl-and-ratchet connection therewith, a flange fast on said second shaft, a pinion having two disks on opposite sides of said flange, toggle-like connections between said disks, a spring tending to hold the latter against said flange, said pinion being in gear with said gear-wheel, and means for reversing the rotation of said rotary shaft when said conveyer reaches the limit of its forward movement, substantially as set forth.

44. The combination with the frame having longitudinally-disposed rods, of a sheet-conveyer movable on said rods, spring-impelled means for moving said conveyer forward, a rotary shaft to which said conveyer is connected, said shaft being operated by said conveyer, and adjustable stop mechanism operated by said rotary shaft for periodically arresting said shaft and conveyer at predetermined points during the forward movement of the latter, substantially as set forth.

45. The combination with the frame having longitudinally-disposed rods, of a sheet-conveyer movable on said rods, spring-impelled means for moving said conveyer forward, a rotary shaft to which said conveyer is connected, said shaft being operated by said conveyer, and stop mechanism operated by said rotary shaft for periodically arresting said shaft and conveyer during the forward movement of the latter, and means carried by said shaft for reversing the rotation thereof at the end of said forward movement, substantially as set forth.

46. The combination with the frame having longitudinally-disposed rods, of a sheet-conveyer movable on said rods, spring-impelled wheels to which said conveyer is connected, a rotary shaft having wheels thereon, belts connecting said conveyer to said wheels, adjustable stop mechanism operated by said rotary shaft for periodically arresting said shaft and conveyer at predetermined points during the forward movement of the latter, and means for reversing the rotation of said shaft at the end of said forward movement, substantially as set forth.

47. The combination with the frame having longitudinally-disposed rods, of a sheet-conveyer movable on said rods, spring-impelled wheels at the forward ends of said rods, belts connecting said wheels to said conveyer, a rotary shaft having wheels thereon, belts connecting said latter wheels to said conveyer, adjustable stop mechanism operated by said rotary shaft for periodically arresting said shaft and conveyer at predetermined points during the forward movement of the latter, and means for reversing the rotation of said shaft at the end of said forward movement, substantially as set forth.

48. The combination with the frame having longitudinally-disposed rods, of a gripper-carriage comprising a cross-rod having end bearings movable on said rods and grippers mounted on said cross-rod, spring-impelled wheels and a rotary shaft having wheels thereon, belts connected to said end bearings and also to all of said wheels, stop mechanism for periodically arresting the forward movement of said carriage, and means for reversing the rotation of said rotary shaft at the end of said movement, substantially as set forth.

49. The combination with the frame having longitudinally-disposed rods, of a gripper-carriage comprising a cross-rod having end bearings movable on said rods and grippers mounted on said cross-rod, shafts at both ends of said frame having wheels thereon provided with grooved peripheries, belts connected to said end bearings and to the peripheries of said wheels, a spring acting on one of said shafts to impel said carriage forward, and stop mechanism for periodically arresting the other shaft during the forward movement of the carriage, substantially as set forth.

50. The gripper-carriage herein described comprising a cross-rod having a series of grippers mounted thereon, and means for opening and closing said grippers, in combination with means for reciprocating said carriage horizontally and means for periodically arresting the forward movement of said carriage, substantially as set forth.

51. The combination with the frame, and the longitudinal rods supported therein, of the gripper-carriage comprising a cross-rod, grippers thereon, a second rod carried by the first-mentioned rod for opening said grippers, bearings for said rods movable on said longitudinal rods, an arm on one end of said second rod, a second arm adjustable on one of said longitudinal rods with which the first-mentioned arm is designed to engage, an arm on the other end of said second rod, a pawl pivoted on one of said bearings designed to be engaged by and hold the last-mentioned arm, and means for disengaging said arm and pawl, substantially as set forth.

52. The combination with the frame, and the longitudinal rods therein, of the spring-impelled gripper-carriage having grippers provided with movable jaws, a rod for moving said jaws, having a crank-arm on one end, an arm adjustable on one of said longitudinal rods with which said crank-arm is designed to engage, means for holding said rod when said jaws are moved thereby, a rotary shaft to which said carriage is connected, means for periodically arresting the forward movement of said rotary shaft and carriage, a spring-impelled wheel on said rotary shaft, a chain connecting said wheel to said adjustable arm, and means on said rotary shaft engaged by said spring-impelled wheel when said carriage is at the end of said forward movement, for effecting the return of said carriage, substantially as set forth.

53. The combination with the main operating-shaft, and a spring-impelled sheet-conveyer, of a rotary shaft to which said conveyer is connected, having a series of concentrically-arranged stop-lugs, a corresponding series of dead-stops designed to be engaged by said stop-lugs, a second shaft having a series of differently-arranged cams for releasing said dead-stops from said stop-lugs, driving mechanism for said second shaft operated by said main operating-shaft, a clutch connection between said rotary shaft and said second shaft, a device for controlling said main operating-shaft having an arm designed to engage and limit the movement of said second shaft, and means for reversing the rotation of said rotary shaft, substantially as set forth.

54. The combination with the main operating-shaft, a clutch-pulley mounted thereon, and a spring-impelled sheet-conveyer, of a rotary shaft to which said conveyer is connected, having a series of concentrically-arranged stop-lugs, a corresponding series of dead-stops designed to be engaged by said stop-lugs, a second shaft having a series of differentially-arranged cams for releasing said dead-stops from said stop-lugs, and also provided with a lug, a wheel on said second shaft, an independent connection between said wheel and its shaft, a belt engaging said wheel and operated by said main operating-shaft, a clutch connection between said second shaft and said rotary shaft, whereby the rotation of the former may be effected by the latter independently of its wheel, a lever for controlling said clutch-pulley having an arm formed with a hooked end designed to be engaged by said lug for limiting the movement of said second shaft, and means for reversing the rotation of said rotary shaft, substantially as set forth.

55. In a printing-machine having a feed-table and a sheet-conveyer, frictional devices normally bearing on said table, and means for elevating said devices as said conveyer reaches a predetermined point away from said table, as set forth.

56. In a printing-machine having a feed-table, a sheet-conveyer movable horizontally on a line with said table, frictional devices normally bearing on said table, and means operated by said conveyer for elevating said frictional devices as said conveyer reaches the limit of its movement away from said table, as set forth.

57. In a printing-machine having a feed-table, and a sheet-conveyer movable horizontally on a line with said table, a frictional device above said table comprising a block, a spring-held, pivoted support therefor, and means for elevating said block when said conveyer reaches the limit of its movement away from said table, as set forth.

58. In a printing-machine having a feed-table, a frictional device above said table comprising a block, a pivoted link by which said block is carried, a spring bearing on said block, a support for said link, and means for rocking said support, as set forth.

59. In a printing-machine having a feed-table, a frictional device above said table comprising a block, a bracket, a rod supported thereby having a right-angular extension formed with an upturned end, a link pivoted to the latter, said link supporting said block, a spring tending to hold said link against said upturned end of said rod, and means for rocking the latter, substantially as set forth.

60. In a printing-machine having a feed-table, a frictional device above said table comprising a block, a bracket, a rod supported thereby having a right-angular extension formed with an upturned end, a link pivoted to the latter, supporting said block, a curved arm extended from said end through said link, a spring on said arm bearing against said link, a spring-held lever on said rod, and means connected to said lever for rocking said rod, substantially as set forth.

61. In a printing-machine having a feed-table, and an arm above said table, a bracket secured to the lower end of said arm, a rod loosely supported by said bracket having a right-angular extension formed with an upturned end, a spring-held link pivoted to the latter, a block projected laterally from said link, a spring secured to said rod for normally holding said block down to said table, and means for rocking said rod, substantially as set forth.

62. The combination with the frame, the feed-table, and a frictional device on the latter, of a shaft supported by said frame having a flattened portion, a second shaft at right angles to the former shaft having cranks, one of which has a projection resting on said flattened portion, a connection between the other crank and said frictional device, and means for partly rotating the first-mentioned shaft for raising said frictional device, substantially as set forth.

63. The combination with the frame, the feed-table, and a spring-held pivoted frictional device having a lever, of a rod connected to said lever, a shaft supported by said frame having a flattened portion, and a second shaft, at right angles to said former shaft, having two cranks splined thereon, one of said cranks being provided with a pin normally resting on said flattened portion, said rod being connected to the other one of said cranks, substantially as set forth.

64. In a printing-machine, the combination with the main operating-shaft having a clutch, a lever for controlling said clutch, a retaining-lever therefor, a feed-table and a horizontally-movable sheet-conveyer, of a pivoted frictional device normally bearing on said table, connections between said frictional device and said retaining-lever for elevating the former, and means for operating said retaining-lever when said conveyer reaches the forward limit of its movement, substantially as set forth.

65. In a printing-machine, the combination with the main operating-shaft having a clutch, a lever for controlling said clutch, a retaining-lever therefor, a feed-table and a horizontally-movable sheet-conveyer, of a pivoted frictional device normally bearing on said table, a rod connected thereto, a shaft having a flattened portion and a crank-arm connected to said retaining-lever, a second shaft at right angles to said former shaft having two cranks, to one of which said rod is connected, the other crank having a pin resting on said flattened portion, and means for operating said retaining-lever when said conveyer reaches the forward limit of its movement, substantially as set forth.

66. In a printing-machine, the combination with the main operating-shaft having a clutch-pulley, and a controlling-lever therefor, of a retaining-lever for said controlling-lever, a horizontally-movable sheet-conveyer, and a rotary member operated by said sheet-conveyer for moving said retaining-lever when said conveyer reaches the forward limit of its movement, whereby said clutch-pulley will be disengaged from said operating-shaft, substantially as set forth.

67. In a printing-machine, the combination with the main operating-shaft having a clutch-pulley, and a controlling-lever therefor, of a retaining-lever for said controlling-lever, a horizontally-movable sheet-conveyer, a rotary shaft to which said conveyer is connected, and an arm carried by said rotary shaft designed to strike said retaining-lever, whereby when said conveyer reaches the forward limit of its movement said clutch-pulley will be disengaged from said operating-shaft, substantially as set forth.

68. In a printing-machine, the combination with the main operating-shaft having a clutch-pulley, and a controlling-lever therefor, of a retaining-lever for said controlling-lever, a horizontally-movable sheet-conveyer, a rotary shaft having wheels thereon, belts connecting said conveyer to said wheels, stop mechanism for periodically arresting the forward movement of said conveyer, and an arm on said rotary shaft designed to strike said retaining-lever when said conveyer reaches the limit of its forward movement, substantially as set forth.

69. In a printing-machine, the combination with the main operating-shaft having a clutch-pulley, and a controlling-lever therefor, of a retaining-lever having a hooked end with which said controlling-lever is designed to engage, a spring-held dog pivoted on said retaining-lever, a horizontally-movable sheet-conveyer, a rotary shaft to which said conveyer is connected, and an arm on said rotary shaft designed to strike said dog and release said controlling-lever when said conveyer reaches the limit of its forward movement, substantially as set forth.

70. In a printing-machine, the combination with the feed-table, the main operating-shaft having a clutch-pulley, and a controlling-lever therefor, of a retaining-lever having a hooked end with which said controlling-lever is designed to engage, a frictional device bearing on said table, connections between said device and said retaining-lever, a horizontally-movable sheet-conveyer, a rotary shaft connected to said conveyer, and an arm on said shaft designed to strike said retaining-lever whereby, first, said clutch-pulley will be disengaged, and, secondly, said frictional device will be raised from said table, substantially as set forth.

71. In a printing-machine, the combination with the feed-table, the main operating-shaft having a clutch-pulley, and a controlling-lever therefor, of a retaining-lever having a hooked end with which said controlling-lever is designed to engage, a frictional device bearing on said table, a shaft having a flattened portion, and a crank-arm, a rod connecting said crank-arm to said retaining-lever, a second shaft at right angles to the last-mentioned shaft having two cranks, one connected to said frictional device, and the other having a pin normally resting on said flattened portion, a horizontally-movable sheet-conveyer, a rotary shaft connected to said conveyer, and an arm on said rotary shaft designed to engage said retaining-lever when said conveyer reaches the limit of its forward movement, substantially as set forth.

72. The combination with the table, the main operating-shaft having a clutch-pulley and a controlling-lever therefor, of a frictional device normally resting on said table, a spring-pressed retaining-lever having at its lower end upper and lower shoulders with which said controlling-lever is designed to engage, connections between said retaining-lever and said frictional device, and means for engaging said retaining-lever whereby, first, said controlling-lever will release said clutch-pulley, and, secondly, said frictional device will be raised from the table, substantially as set forth.

73. The combination with the frame and the longitudinal rods therein, of the spring-impelled sheet-conveyer movable on said rods, a cross-rod extended transversely between said longitudinal rods and having fingers projecting therefrom in line of travel of said conveyer, and a conveying-belt beneath said rods, substantially as set forth.

74. The combination with the frame and the longitudinal rods therein, of the spring-impelled sheet-conveyer movable on said rods, said conveyer having grippers, a cross-rod extended transversely between said longitudinal rods and having fingers projecting therefrom in line of travel of said conveyer, means for opening said grippers when they reach said fingers, and a conveying-belt beneath said rods, substantially as set forth.

In testimony whereof we have signed this specification in the presence of two subscribing witnesses.

CHARLES GRANT HARRIS.
JOHN FRANKLIN McNUTT.

Witnesses:
W. H. SMILEY,
MARY MOGEE.